Dec. 1, 1936.   H. E. OSBORN   2,062,759
HAND BRAKE OPERATING MECHANISM FOR RAILWAY CARS
Filed April 22, 1935   3 Sheets-Sheet 1
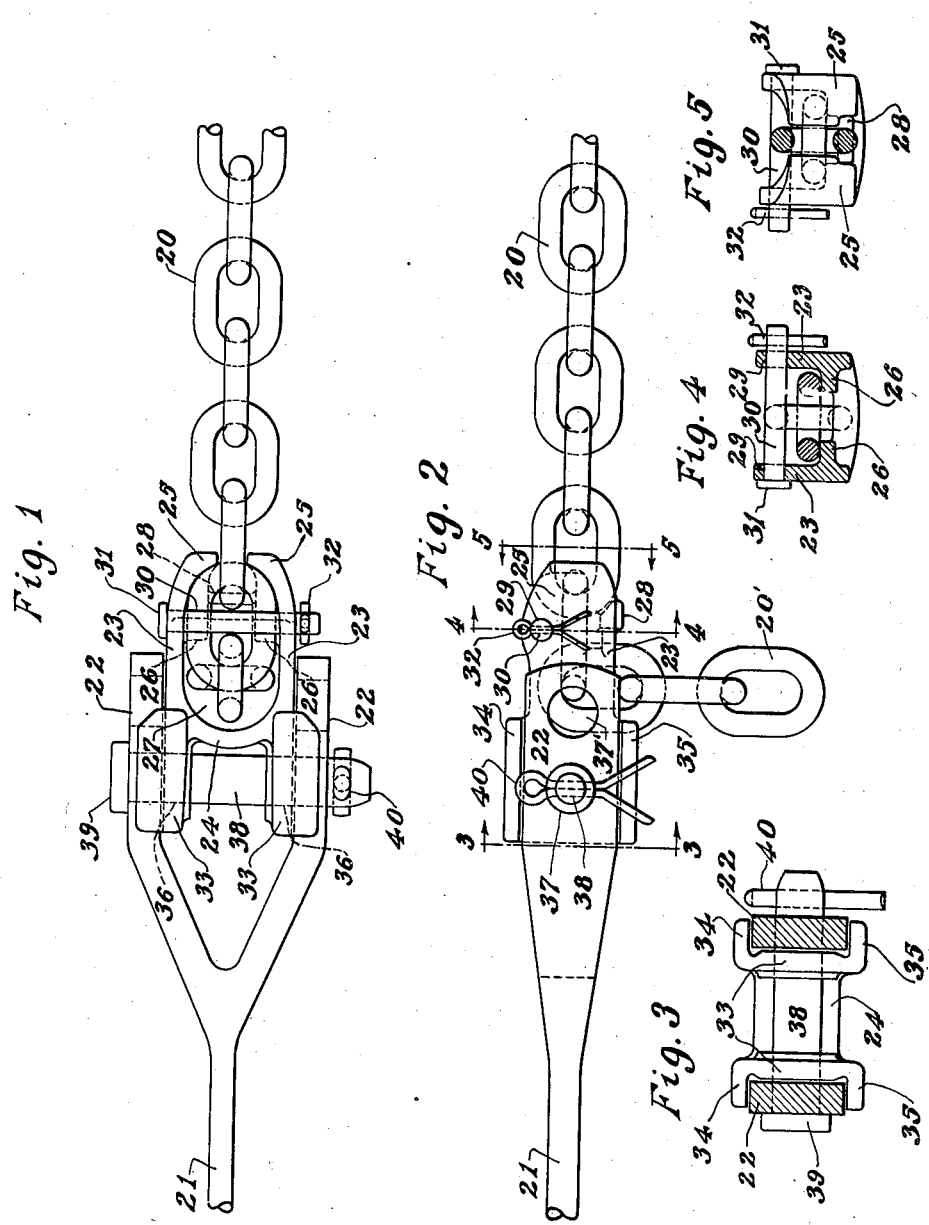
Inventor
Howard E. Osborn
By Fisher, Clapp, Soans + Pond
Attys.

Dec. 1, 1936. H. E. OSBORN 2,062,759
HAND BRAKE OPERATING MECHANISM FOR RAILWAY CARS
Filed April 22, 1935 3 Sheets-Sheet 2
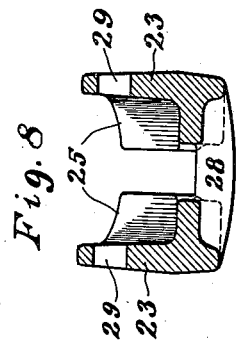
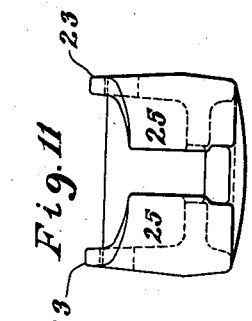
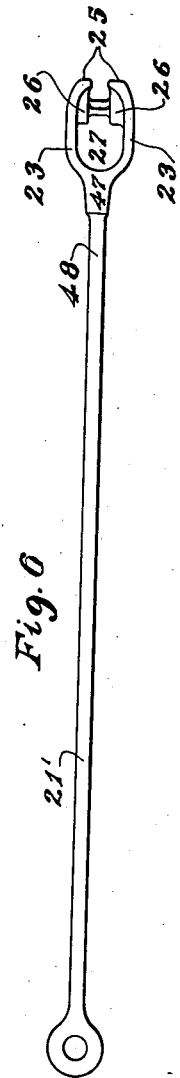
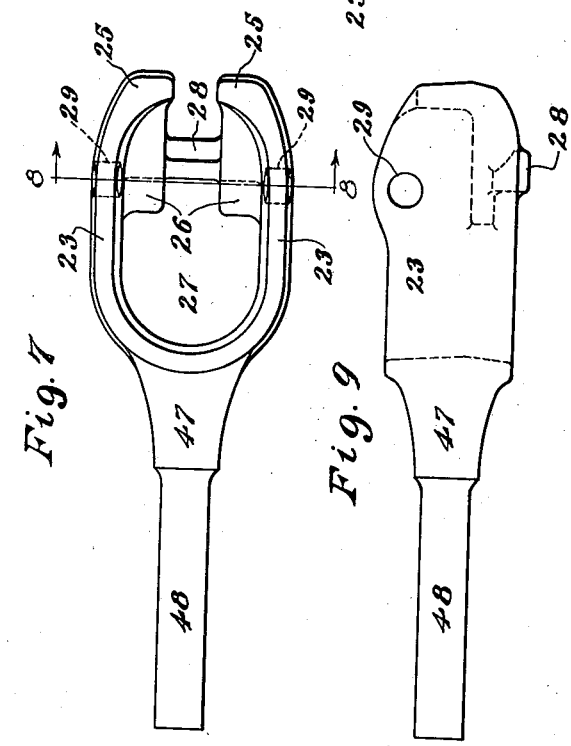
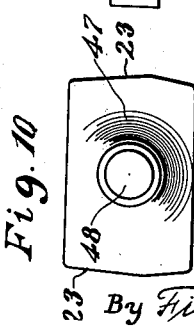
Inventor
Howard E. Osborn
By Fisher, Clapp, Soans & Pond,
Attys.

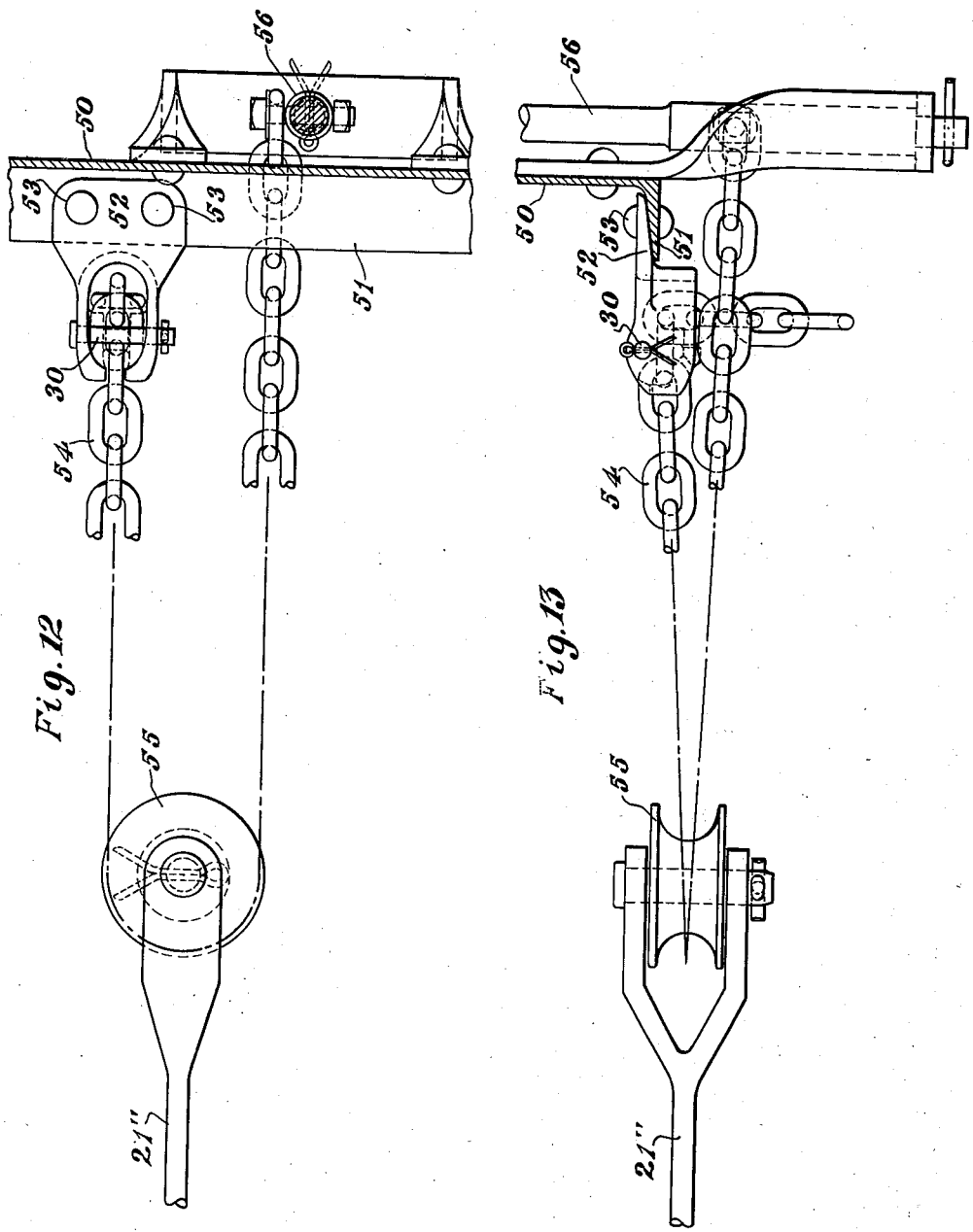

Patented Dec. 1, 1936

2,062,759

UNITED STATES PATENT OFFICE 2,062,759

HAND BRAKE OPERATING MECHANISM FOR RAILWAY CARS

Howard E. Osborn, Michigan City, Ind.

Application April 22, 1935, Serial No. 17,602

20 Claims. (Cl. 188—197)

This invention relates to the art of hand brake operating devices for railway cars, and has reference more specifically to improvements in the hand brake chain connection to the hand brake rod or improvements in anchoring the hand brake chain. Statistics have shown that one of the three major causes of hand brake accidents has been excessive length of brake chain, causing kinking, fouling, etc.,—a condition that causes annually ten per cent of all hand brake accidents.

One object of the present invention is to provide a hand brake chain connection to the hand brake rod by which without the use of a special end link and clevis the proper effective chain length can be established directly on the car when a new or repaired chain is applied or whenever necessary even though the chain itself is much too long for safe and efficient operation of the hand brake. Another object has been to provide an improved chain holder or grip capable of being engaged with any link of the chain while permitting excess chain length to hang therefrom and provided with means for connection to a hand brake rod. Another object has been to provide such a chain holder having a double adjustment for length between the chain and the hand brake rod. Another object has been to provide a simple and direct connecting means between the brake chain and a brake rod having a forked end that will provide for longitudinal adjustment to take up chain slack. Another object has been to provide an adjustable chain holder or grip capable of being directly welded to an end of the hand brake rod so as to form a rigid one-piece chain connection and rod combined; and a still further object of the invention has been to provide an improved chain holder for use as a chain anchor that will permit longitudinal adjustment of the effective length of the chain without excess chain interfering with the function of the effective portion of the chain.

With these objects in view, the invention consists in the matters hereinafter described, shown in their preferred forms or embodiments in the accompanying drawings, and distinctly defined in the claims.

In the drawings—

Fig. 1 is a plan view of the chain holder showing the same serving as an adjustable connection between the brake chain and a forked hand brake rod.

Fig. 2 is a side elevation of the assembly shown in Fig. 1.

Figs. 3, 4 and 5 are cross-sections on the lines 3—3, 4—4, and 5—5 respectively of Fig. 2.

Fig. 6 is a plan view of a one-piece hand brake rod and adjustable chain grip or holder.

Fig. 7 is an enlarged plan view of the chain holder shown in Fig. 6 with its integral heat-protecting shank and welding piece.

Fig. 8 is a cross section on the line 8—8 of Fig. 7.

Fig. 9 is a side elevation of Fig. 7.

Fig. 10 is an end elevation of Fig. 9, viewed from the left.

Fig. 11 is an end elevation of Fig. 9, viewed from the right.

Fig. 12 is a top plan view, showing a modified form of the adjustable chain holder of Figs. 1 to 5 adapted to serve as an adjustable chain anchor.

Fig. 13 is a side elevation of the assembly shown in Fig. 12.

Referring first to Figs. 1 to 5 inclusive, 20 designates a fragment of the hand brake chain, one end of which may be attached to a bell crank, a brake staff or any other means to produce a pull on the chain in the usual manner. 21 designates the hand brake rod, one end of which is, in this instance, forked, the limbs of the fork including parallel end portions 22.

The chain holder or grip consists preferably of a steel casting comprising spaced side walls 23 rigidly connected at one end by a transverse wall 24 and at their other end terminating in inwardly curved jaws 25, the ends of which as shown in Fig. 1, are spaced approximately the thickness of a link of the chain 20. On the inner sides of the forward portion of the walls 23 and the jaws 25 are ledges 26 that form a seat for a link of the chain 20 lying between the side walls. The jaws 25 form an abutment for the said link, and, in rear of the ledges 26 is an opening 27 through which may extend an excess portion 20' of the chain 20. For increased strength and rigidity, the walls 23 are connected by a cross bar 28. In the upper portions of the side walls 23 are formed registering holes 29, through which extends a removable locking pin 30, one end of which has a head 31, and the other end of which is transversely apertured to receive a cotter pin 32.

From the foregoing description it will be apparent that, with the locking pin 30 withdrawn, the end portion of the chain to be engaged by the chain holder may be entered from above, with one of the horizontal links of the chain seated on the ledges 26 and abutting against the jaws 25, and with the excess portion 20' (if any) allowed to drop through the rear opening 27 and depend from the chain holder in the manner shown in Fig. 2.

The rear end of the chain holder is provided with means for connecting the same to a brake rod. Where a forked brake rod is employed, as shown herein, the chain holder is formed with an integral shank which may consist of a pair of parallel arms 33 each formed with upper and lower outwardly directed flanges 34 and 35 respectively, said arms and their flanges forming slideways for the parallel limbs 22 of the brake rod fork, as clearly shown in Fig. 3. One of the pairs of relatively slidable arms 22 and 33 is formed with a pair of registering holes, and the other pair is formed with a plurality of spaced pairs of registering holes; in the instance shown the arms 33 having a single pair of registering holes 36 and the arms 22 having two pairs of registering holes 37 and 37'. A transverse connecting bolt 38 provided with a head 39 and a cotter pin 40 may be passed through the holes 36 and 37, as shown in Figs. 1 and 2, or through the holes 36 and 37' in the event that a lengthening of the connection between chain 20 and brake rod 21 is required.

The portion of the device that is directly engaged with the chain affords a take-up or let-out of two link lengths without twisting the chain; while the centers of the holes 37, 37' are spaced preferably one link length. If, therefore, an adjustment of two link lengths either way is excessive, this can be compensated for to the extent of one link length by shifting the relative positions of the arms 22 and 33. Thus the complete device provides for adjustments of a single link length without involving any twisting of the chain, which is undesirable.

Figs. 6 to 11 inclusive illustrate a construction employing the same form of chain holder as is shown in Figs. 1 to 5, but a different connection therefrom to the hand brake rod. In this form of the invention, the chain holder is provided at its rear end with an integral heat-protecting shank 47 and, continuous with said shank, a welding piece 48. For the practical application of this device to existing hand brake rods, the end portion of the rod 21' that is ordinarily connected to the brake chain may be cut off for a certain distance, and the welding piece 48 welded thereto, producing the one-piece structure shown in Fig. 8. This provides a construction wherein the chain holder or grip is integral with the main length of the hand brake rod.

In Figs. 12 and 13 I illustrate a modification of the chain holder shown in Figs. 1 to 5 and also in Figs. 6 to 11, adapting the same to serve as a chain anchor for connection to a stationary part of the car frame. In these views 50 represents a fragment of a metal end frame member of the car body that has on its lower edge an inturned flange 51. The chain receiving portion of the chain anchor is identical with that shown in Figs. 1 to 5 and 6 to 11, but the same is formed with an integral broad attachment plate 52 that overlies the flange 51 and is rigidly attached to the latter as by rivets 53. 54 designates the hand brake chain which extends from the anchor member over a sheave 55 journaled in the forked end of the brake rod 21" and thence to the usual brake staff 56 that constitutes the chain-pulling means. This general combination of chain anchor, chain, sheave or multiplying lever on the brake rod and chain-pulling means is broadly old and known as, for examples, in patents to Wrigley 1,543,467, June 23, 1925, and to Bartsch 1,623,227, April 5, 1927; but, so far as I am aware, the form and construction of chain anchor herein shown and described is new, and provides a very simple and easy means of taking up slack in the chain by the mere removal of locking pin 30, the lifting of the chain from its seat, the engagement of another link with the jaws of the anchor, and the replacement of the locking pin 30.

While I have shown preferred forms of the invention, these are for purposes of illustration only and the invention is not to be considered as limited to the particular forms and embodiments illustrated except to the extent indicated in specific claims.

I claim:

1. A device for connecting a brake chain to a brake rod, comprising an open top member having formed therein a horizontal seat for supporting the two side limbs of a link, an abutment for an end of said link, and means on one end of said member adapted for connection to a brake rod.

2. A device for connecting a brake chain to a brake rod, comprising an open top member having a support for a horizontal link of a chain, side walls spaced apart, an abutment for said link, means to prevent unintentional disengagement of the said link from said abutment and an integral shank on the rear end of said member adapted for connection to a brake rod.

3. A chain holder, comprising a member having spaced side walls rigidly connected at one end and at the other end terminating in jaws forming an abutment for a link lying between them, and ledges on the inner sides of said walls forming a seat for said link.

4. A chain holder, comprising a member having spaced side walls rigidly connected at one end and at the other end terminating in jaws forming an abutment for a link lying between them, ledges on the inner sides of said walls forming a seat for said link, and an opening in rear of said ledges for the passage of excess chain.

5. A chain holder, comprising a member having spaced side walls rigidly connected at one end and at the other end terminating in jaws forming an abutment for a link lying between them, ledges on the inner sides of said walls forming a seat for said link, and a cross bar connecting said walls.

6. A chain holder, comprising a member having spaced side walls rigidly connected at one end and at the other end terminating in jaws forming an abutment for a link lying between them, ledges on the inner sides of said walls forming a seat for said link, an opening in rear of said ledges for the passage of excess chain, and a cross bar connecting said walls.

7. A chain holder, comprising a member having spaced side walls rigidly connected at one end and at the other end terminating in jaws forming an abutment for a link lying between them, the connected ends of said jaws being spaced to receive an adjacent link disposed in a plane perpendicular to the plane of said first named link, and ledges on the inner sides of said walls forming a seat for said first named link.

8. A chain holder, comprising a member having spaced side walls rigidly connected at one end and at the other end terminating in jaws forming an abutment for a link lying between them, the connected ends of said jaws being spaced to receive an adjacent link disposed in a plane perpendicular to the plane of said first named link, ledges on the inner sides of said jaws forming a seat for said first named link, and a cross bar connecting said walls.

9. A chain holder, comprising a member having spaced side walls rigidly connected at one end and at the other end terminating in jaws forming an abutment for a link lying between them, said side walls having registering holes, ledges on the inner sides of said walls below said holes forming a seat for said link, and a pin extending through said holes to lock said link to its seat in said holder.

10. A device for adjustably connecting a brake chain to a brake rod, comprising a member having a horizontal supporting seat for the two side limbs of a link, jaws at one end of said seat fitting and forming an abutment for one end of said link, and an opening in rear of said seat for the passage of excess chain, and means on one end of said member adapted for connection to a brake rod.

11. A device for adjustably connecting a brake chain to a brake rod, comprising a member having a horizontal supporting seat for the two side limbs of a link, jaws at one end of said seat fitting and forming an abutment for one end of said link, and an opening in rear of said seat for the passage of excess chain, and an integral shank on the rear end of said member adapted for connection to a brake rod.

12. In combination with a brake rod having a forked end, means for adjustably connecting a brake chain to said rod, comprising a member shaped to have draft engagement with any selected link of said chain, a pair of arms on the rear of said member slidably fitting the arms of said forked end, and a connecting pin extending through said arms.

13. In combination with a brake rod having a forked end, means for adjustably connecting a brake chain to said rod, comprising a member shaped to have draft engagement with any selected link of said chain, a pair of arms on the rear of said member slidably fitting the arms of said forked end, the arms of one pair having flanges overlapping the arms of the other pair, and a connecting pin extending through said arms.

14. In combination with a brake rod having a forked end, means for adjustably connecting a brake chain to said rod, comprising a member shaped to have draft engagement with any selected link of said chain, a pair of arms on the rear of said member slidably fitting the arms of said forked end, the arms of one pair having a pair of registering holes and the arms of the other pair having a plurality of spaced pairs of registering holes, and a connecting pin adapted to engage with any registering pairs of said holes.

15. In combination with a brake rod, means for adjustably connecting a brake chain to said rod, comprising a forked extension of one end of said rod the arms of which have a plurality of spaced pairs of holes, a bolt adapted to engage with any of said pairs of holes, and means connecting said bolt to said brake chain.

16. The combination with a hand brake rod, of a chain-engaging grip integral with the main length of said rod and shaped to have draft engagment with the outer side of an end of a chain link.

17. The combination with a hand brake rod, of a chain-engaging grip integral with the main length of said rod, and shaped to surround the sides and one end of a chain link.

18. A one-piece brake rod and chain grip, comprising a member adapted to seat a link of the chain and formed with jaws constituting an abutment for said link, said member having at one end thereof a welding piece, and a brake rod welded to said welding piece.

19. A one-piece brake rod and chain grip, comprising a member adapted to seat a link of the chain and formed with jaws constituting an abutment for said link, said member having at one end thereof a heat-protecting shank and continuous with said shank a welding piece, and a brake rod welded to said welding piece.

20. A chain anchor for adjustably connecting a hand brake chain to a stationary member of a car, comprising a member shaped to have draft engagement with any selected link of said chain, and an integral longitudinal extension of said member adapted to be riveted or bolted to said stationary member.

HOWARD E. OSBORN.